United States Patent
Chen et al.

(10) Patent No.: US 11,238,213 B2
(45) Date of Patent: Feb. 1, 2022

(54) METHOD AND APPARATUS FOR DISPLAYING FUNCTION PARAMETER IN SPREADSHEET, AND ELECTRONIC DEVICE

(71) Applicants: BEIJING KINGSOFT OFFICE SOFTWARE, INC., Beijing (CN); ZHUHAI KINGSOFT OFFICE SOFTWARE CO., LTD., Guangdong (CN); GUANGZHOU KINGSOFT MOBILE TECHNOLOGY CO., LTD., Guangzhou (CN)

(72) Inventors: Bo Chen, Zhuhai (CN); Xialin Pi, Zhuhai (CN); Zelin Ai, Zhuhai (CN); Linjian Xiang, Zhuhai (CN); Qingyuan Zhang, Zhuhai (CN)

(73) Assignees: BEIJING KINGSOFT OFFICE SOFTWARE, INC., Beijing (CN); ZHUHAI KINGSOFT OFFICE SOFTWARE CO., LTD., Guangdon (CN); GUANGZHOU KINGSOFT MOBILE TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/619,413

(22) PCT Filed: May 14, 2018

(86) PCT No.: PCT/CN2018/086665
§ 371 (c)(1),
(2) Date: Dec. 4, 2019

(87) PCT Pub. No.: WO2018/223813
PCT Pub. Date: Dec. 13, 2018

(65) Prior Publication Data
US 2020/0184147 A1   Jun. 11, 2020

(30) Foreign Application Priority Data

Jun. 6, 2017   (CN) .......................... 201710418474.1

(51) Int. Cl.
*G06F 40/174*   (2020.01)
*G06F 9/451*   (2018.01)
(Continued)

(52) U.S. Cl.
CPC .......... *G06F 40/174* (2020.01); *G06F 3/0482* (2013.01); *G06F 9/451* (2018.02); *G06F 9/542* (2013.01); *G06F 40/18* (2020.01)

(58) Field of Classification Search
CPC ........ G06F 40/18; G06F 40/174; G06F 9/451; G06F 3/0482; G06F 9/542
See application file for complete search history.

(56) References Cited

U.S. PATENT DOCUMENTS

| 5,890,174 A | 3/1999 | Khanna et al. |
| 6,026,233 A | 2/2000 | Shulman et al. |

(Continued)

FOREIGN PATENT DOCUMENTS

| CN | 1525359 A | 9/2004 |
| CN | 1755668 A | 4/2006 |

(Continued)

OTHER PUBLICATIONS

PCT International Search Report and the Written Opinion dated Jul. 18, 2018, issued in related International Application No. PCT/CN2018/086665 with partial translation (8 pages).
(Continued)

*Primary Examiner* — Wilson W Tsui

(57) ABSTRACT

Embodiments of a method and an apparatus for providing a prompt of a function parameter in a spreadsheet and of an electronic device are provided. The method includes: obtain-
(Continued)

ing a first function parameter of a function in the spreadsheet; determining whether the first function parameter is associated with a dynamic constraint rule, wherein the dynamic constraint rule is that there is a dynamic constraint that associates the first function parameter with another function parameters in a function to which the first function parameter belongs; if the first function parameter is associated with a dynamic constraint rule, calculating a value range of the first function parameter based on the dynamic constraint rule; and presenting a prompt for the first function parameter based on the value range. By applying the embodiments provided in the present application, a user can input correct content for a parameter quickly and accurately. An inappropriate input for a parameter and thus erroneous calculation of the related formula are avoided.

10 Claims, 3 Drawing Sheets

(51) Int. Cl.
*G06F 40/18* (2020.01)
*G06F 3/0482* (2013.01)
*G06F 9/54* (2006.01)

(56) References Cited

U.S. PATENT DOCUMENTS

| | | | |
|---|---|---|---|
| 7,447,706 B2* | 11/2008 | Chtcherbatchenko | G06F 40/154 |
| 9,286,285 B1* | 3/2016 | Vagell | G06F 40/18 |
| 9,286,286 B1 | 3/2016 | Ghaddar | |
| 9,378,197 B1 | 6/2016 | Ghanem | |
| 9,440,748 B1* | 9/2016 | Lentz | B64D 45/00 |
| 2002/0118221 A1 | 8/2002 | Hudson et al. | |
| 2003/0226115 A1* | 12/2003 | Wall | G06F 40/174 715/210 |
| 2004/0158557 A1 | 8/2004 | Welcker et al. | |
| 2005/0198621 A1* | 9/2005 | Tillmann | G06F 11/3624 717/128 |
| 2006/0036996 A1 | 2/2006 | Low | |
| 2006/0075328 A1 | 4/2006 | Becker et al. | |
| 2006/0129929 A1* | 6/2006 | Weber | G06F 40/274 715/267 |
| 2006/0224553 A1 | 10/2006 | Chtcherbatchenko et al. | |
| 2006/0277525 A1* | 12/2006 | Najmabadi | G06F 8/33 717/106 |
| 2007/0074130 A1* | 3/2007 | Folting | G06F 40/18 715/792 |
| 2007/0130503 A1 | 6/2007 | Voshell | |
| 2008/0154824 A1* | 6/2008 | Weir | G06N 7/005 706/45 |
| 2008/0189655 A1* | 8/2008 | Kol | G06Q 10/10 715/808 |
| 2009/0112916 A1* | 4/2009 | Stuhec | G06F 40/143 |
| 2010/0083089 A1 | 4/2010 | Rapp et al. | |
| 2010/0095195 A1* | 4/2010 | Coblenz | G06F 40/18 715/212 |
| 2014/0372854 A1 | 12/2014 | Otero et al. | |
| 2014/0372952 A1* | 12/2014 | Otero | G06F 40/18 715/835 |
| 2015/0169530 A1 | 6/2015 | Otero et al. | |
| 2016/0026439 A1* | 1/2016 | Zaydman | G06F 8/33 717/113 |
| 2017/0249059 A1* | 8/2017 | Houseworth | G06F 3/04895 |

FOREIGN PATENT DOCUMENTS

| | | |
|---|---|---|
| CN | 101425007 A | 5/2009 |
| CN | 102999289 A | 3/2013 |
| CN | 103336762 A | 10/2013 |
| CN | 103336762 B | 6/2016 |
| EP | 1672527 A2 | 6/2006 |
| JP | 2004532482 A | 10/2004 |
| JP | 2006-172445 A | 6/2006 |
| WO | 02097608 A2 | 12/2002 |

OTHER PUBLICATIONS

Extended Search Report for European Application No. 18814012.3, dated May 25, 2020, 11 pages.
Chambers C. et al: "Reasoning about Spreadsheets with labels and dimensions", Journal of Visual Languages & Computing, Academic Press, United Kingdom, vol. 21, No. 5, ISSN: 1045-926X, DOI: 10.1016/J.JVLC. 2010.08.004.
First Office Action for Japanese Application No. 2019-567360, dated Mar. 2, 2021 (6 pages).
First Office Action for Chinese Application No. 20171041847.1, dated Apr. 6, 2021 (12 pages).
Notice of Reasons for Refusal for Japanese Application No. 2019-567360 dated Nov. 30, 2021.

* cited by examiner

METHOD AND APPARATUS FOR DISPLAYING FUNCTION PARAMETER IN SPREADSHEET, AND ELECTRONIC DEVICE

The present application is a national phase application of International Application No. PCT/CN2018/086665, filed on May 14, 2018, which claims priority to Chinese patent application No. 201710418474.1, filed with the China National Intellectual Property Administration on Jun. 6, 2017 and entitled "Method and Apparatus for Prompting Function Parameter in Spreadsheet, and Electronic Device", which is incorporated herein by reference in its entirety.

TECHNICAL FIELD

The present application relates to the field of information technology, and in particular, to a method, apparatus and electronic device for providing a prompt of a function parameter in a spreadsheet.

BACKGROUND

In a spreadsheet, functions are often used to process data. A function in the spreadsheet is mainly composed of a function body (such as SUM, COUNT, VLOOOKUP, etc.) and one or more function parameters (such as 12, name, B1:B9, etc.). The function body is used to indicate a specific operation rule, and the function parameters are used to specify the data used in the operation rule. Prompt of a function parameter in the spreadsheet may greatly facilitate the user to input an expected value for the function parameter.

As to existing methods for providing a prompt of a function parameter in a spreadsheet, a list is prepared for each function parameter associated with a constraint, and the list is constant. When a value for the function parameter is about to entered, the list is displayed to prompt a user for selection. For example, the option list for the first parameter of the SUBTOTAL function includes options such as AVERAGE, COUNT, COUNTA, MAX, MIN, etc. FIG. 1 shows a schematic diagram of a method for prompting of a function parameter in a static manner in the prior art. The user enters the value for a corresponding function parameter by selecting an option in the prompted list, for corresponding data processing.

However, in the existing methods for providing a prompt of function parameters in a spreadsheet, the used lists are constant, that is, each of the function parameters associated with a static constraint. There are a large number of functions in the spreadsheet, and constraints for parameters of the functions are different from each other. For a function parameter associated with a dynamic constraint, the value range of this function parameter has to be determined depending on the value of another function parameter in this function. If a list of options for the function parameter based on a static constraint is used to prompt a user, the user is likely to input an inappropriate value for the function parameter. For example, the function VLOOKUP looks up a given value in a data array and returns the corresponding value from another column of the array. The VLOOKUP (lookup_value, table_array, col_index_num, range_lookup) function includes four function parameters; with the second function parameter table_array indicating the range to look for the value, and the third function parameter col_index_num indicating the number of column in the range containing the return value. Here, the value range of the third function parameter is based on the second function parameter. If a fixed value range is employed as a prompt for the third function parameter in the existing methods, this fixed value range is likely to exceed the value range of the second function parameter. This may result in an inappropriate value for the function parameter from the user following this prompt, and thus result in an erroneous calculation.

SUMMARY

The purpose of the embodiments of the present application is to provide a method, apparatus and electronic device for providing a prompt of a function parameter in a spreadsheet, so as to enable the user to input the correct value of the function parameter quickly and accurately and to avoid the erroneous calculation of the formula. Specifically, the technical solutions are illustrated as follows.

An embodiment of the present application discloses a method for providing a prompt of a function parameter in a spreadsheet. The method includes:

obtaining a first function parameter of a function in the spreadsheet;

determining whether the first function parameter is associated with a dynamic constraint rule, wherein the dynamic constraint rule indicates that there is a dynamic constraint between the first function parameter and another function parameter in the function:

if the first function parameter is associated with a dynamic constraint rule, calculating a value range of the first function parameter based on the dynamic constraint rule; and presenting a prompt for the first function parameter based on the value range.

Optionally, determining whether the first function parameter is associated with a dynamic constraint rule includes:

retrieving a dynamic constraint parameter list for the spreadsheet, wherein the dynamic constraint parameter list is a set of elements comprising a function parameter, another function parameter associated with the function parameter through a dynamic constraint, and the dynamic constraint; and determining whether the first function parameter is associated with the dynamic constraint rule from the dynamic constraint parameter list.

Optionally, calculating the value range of the first function parameter based on the dynamic constraint rule includes:

obtaining a value range of a second function parameter in the function, which is associated with the first function parameter through a dynamic constraint; and calculating the value range of the first function parameter based on the dynamic constraint and the value range of the second function parameter.

Optionally; presenting the prompt for the first function parameter based on the value range includes:

displaying the value range of the first function parameter in a drop-down list or in a prompting bubble.

Optionally, obtaining the first function parameter of the function in the spreadsheet includes:

detecting input for the first function parameter in the spreadsheet.

An embodiment of the present application also discloses an apparatus for providing a prompt of a function parameter in a spreadsheet. The apparatus includes:

a detection module, configured for obtaining a first function parameter of a function in the spreadsheet:

a determination module, configured for determining whether the first function parameter is associated with a dynamic constraint rule, wherein the dynamic constraint rule indicates that there is a dynamic constraint between the first function parameter and another function parameter in the function:

a processing module, configured for, if the first function parameter is associated with a dynamic constraint rule, calculating a value range of the first function parameter based on the dynamic constraint rule; and a prompt module, configured for presenting a prompt for the first function parameter based on the value range.

Optionally, the determination module includes:

a retrieving sub-module, configured for retrieving a dynamic constraint parameter list for the spreadsheet, wherein the dynamic constraint parameter list is a set of elements comprising a function parameter, another function parameter associated with the function parameter through a dynamic constraint, and the dynamic constraint; and a determination sub-module, configured for determining whether the first function parameter is associated with the dynamic constraint rule from the dynamic constraint parameter list.

Optionally, the processing module includes:

a value obtaining sub-module, configured for obtaining a value range of a second function parameter in the function, which is associated with the first function parameter through a dynamic constraint; and a calculation sub-module, configured for calculating the value range of the first function parameter based on the dynamic constraint and the value range of the second function parameter.

Optionally, the prompt module includes:

a display sub-module, configured for displaying the value range of the first function parameter in a drop-down list or in a prompting bubble.

Optionally, the detection module includes:

a detection sub-module, configured for detecting input for the first function parameter in the spreadsheet.

An embodiment of the present application discloses an electronic device including a processor, a communication interface, a memory and a communication bus; wherein the processor, the communication interface and the memory communicate with each other via the communication bus;

the memory is configured for storing a computer program:

the processor is configured for, by executing the program stored in the memory, carrying out the steps of the above-described method for providing a prompt of a function parameter in a spreadsheet.

An embodiment of the present application discloses a computer readable storage medium having stored thereon a computer program thereon which, when executed by a processor, causes the processor to carry out the steps of the above-described method for providing a prompt of a function parameter in a spreadsheet.

An embodiment of the present application also discloses an application program which, when executed, implements the steps of the above-described method for providing a prompt of a function parameter in a spreadsheet.

Embodiments of a method and an apparatus for providing a prompt of a function parameter in a spreadsheet, and an electronic device are provided herein. The embodiments first obtain a first function parameter of a function in the spreadsheet; and then determine whether the first function parameter is associated with a dynamic constraint rule, wherein the dynamic constraint rule indicates that there is a dynamic constraint between the first function parameter and another function parameter in the function. If a dynamic constraint rule is associated with the first function parameter, the embodiments calculate a value range of the first function parameter based on the dynamic constraint rules; and present a prompt for the first function parameter based on the value range. It can be seen that the value range of the function parameter associated with a dynamic constraint rule is determined based on the dynamic constraint rule, and a prompt for the function parameter is presented based on the value range, which facilitates a user to input a correct value for the function parameter quickly and accurately, avoiding erroneous calculation due to an inappropriate value for the function parameter. Of course, any product or method for implementing the embodiments of the present application does not necessarily require all of the advantages described above.

BRIEF DESCRIPTION OF THE DRAWINGS

In order to more clearly describe the technical solutions of the embodiments of the present application or of the prior art, drawings used in the embodiments and the prior art will be briefly described below Obviously, the drawings described below are for only some embodiments of the present application. Those skilled in the art may also obtain other drawings based on the drawings described herein without any creative efforts.

DETAILED DESCRIPTION

The technical solutions of the present application will be clearly and completely described in detail with reference to the drawings of embodiments of the present application. Obviously, the embodiments described are merely some of the embodiments of the present application, instead of all the embodiments. Any other embodiments obtained by those skills in the art based on the embodiments herein without any creative efforts are within the scope of the protection of the present application.

In the existing method for providing a prompt of a function parameter in a spreadsheet, the prompt for all function parameters is static. That is, the content of the list for prompting is always unchanged, which does not change as function of other factors, such as values of other function parameters in the same function. This is likely to result in inappropriate inputs for the function parameters from the user. Therefore, it is necessary to provide a method for providing a prompt of a function parameter to facilitate the user input appropriate content for the function parameter quickly and accurately.

A method for providing a prompt of a function parameter in a spreadsheet provided by an embodiment of the present invention is applicable, but not limited, to any electronic device capable of displaying a spreadsheet, such as a computer, a tablet computer, a mobile phone, etc.

Figure 1:
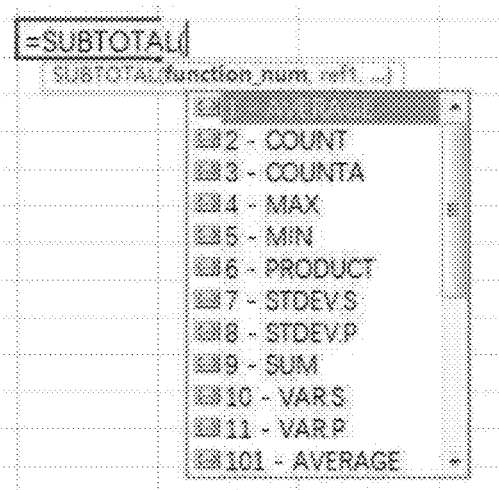
FIG. 1 is a schematic diagram of a method for prompting of a function parameter in a static manner in the prior art.
Figure 2:
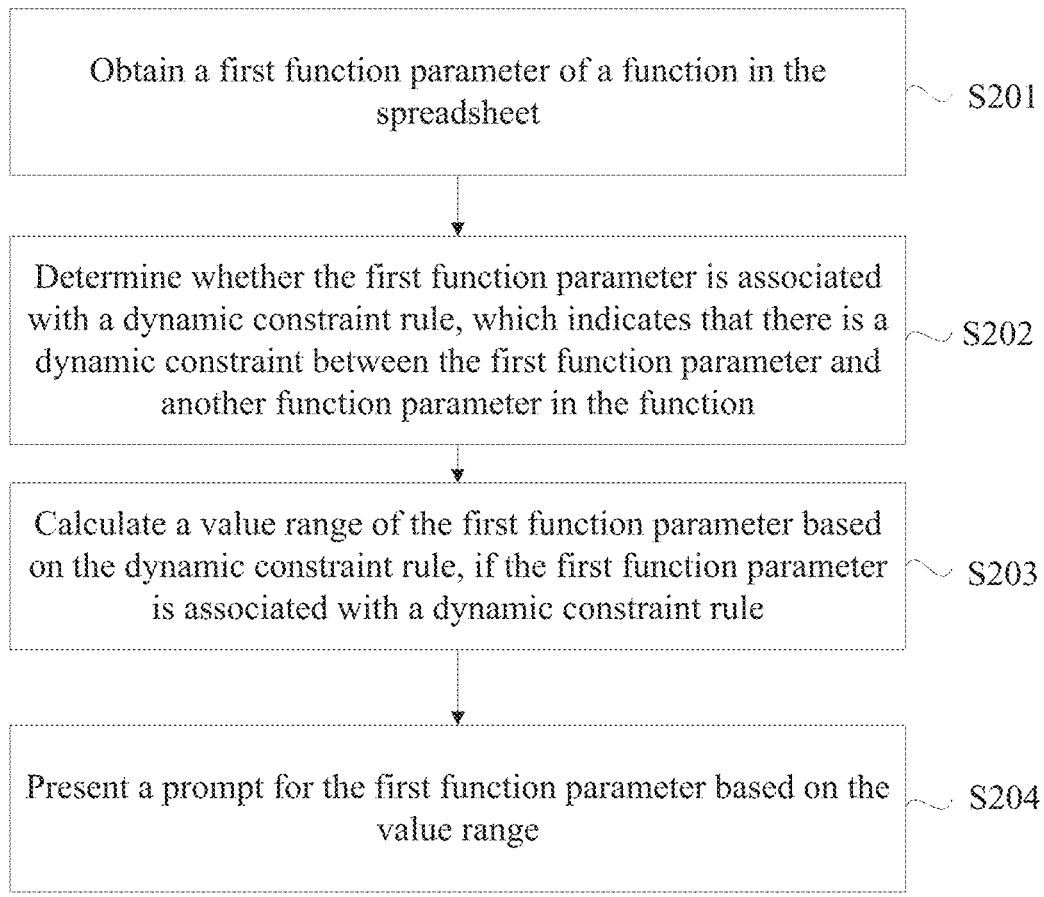
FIG. 2 is a schematic flowchart of a method for providing a prompt of a function parameter in a spreadsheet provided by an embodiment of the present application.

Referring to FIG. 2, FIG. 2 is a schematic flowchart of the method for providing a prompt of a function parameter in a spreadsheet provided by an embodiment of the present application, including the following steps.

At S201, a first function parameter of a function in the spreadsheet is obtained.

Specifically, the input of the first function parameter in the spreadsheet may be detected. The first function parameter is obtained by detecting an operation on the first function parameter, such as a click on or an input of the first function parameter. Here, the first function parameter may be any function parameter in the spreadsheet, and this naming is used primarily to distinguish it from a second function parameter in the present application.

When an operation on a function parameter is performed in the spreadsheet, for example the function parameter is clicked or entered, this function parameter may be obtained as the first function parameter. For example, when a user is entering a value for a function parameter in the spreadsheet or the user clicks a function parameter in a list of function parameters for input, the function parameter may be obtained at this time.

At S202, it is determined whether the first function parameter is associated with a dynamic constraint rule. A dynamic constraint rule is that there is a dynamic constraint that associates the first function parameter with another function parameter in the function to which the first function parameter belongs.

The dynamic constraint rule indicates that there is a dynamic constraint between the first function parameter of the function and another function parameter in this function.

When the first function parameter is obtained, the embodiment may determine whether the first function parameter is associated with a dynamic constraint rule. The first function parameter will be processed differently depending on whether a dynamic constraint rule is associated therewith. The embodiment makes such determination with respect to the function parameter. This is totally different from the method for providing a prompt of a function parameter in the prior art, in which no determination as to whether a dynamic constraint rule is associated with the function parameter and all function parameters are processed in a same way. By determining whether a dynamic constraint rule is associated with the function parameter and processing the function parameter accordingly, different value ranges for the function parameter are displayed for prompt, so that a more accurate value can be input for the function parameter. The dynamic constraint is the relationship between value ranges of function parameters.

At S203, if the first function parameter is associated with a dynamic constraint rule, a value range of the first function parameter is calculated based on the dynamic constraint rule.

If a dynamic constraint rule is associated with the first function parameter, there is a dynamic constraint between the first function parameter and another function parameter in the function to which the first function parameter belongs. Therefore, the value range of the first function parameter is calculated based on the other function parameter that is associated with the first function parameter through the dynamic constraint. The value range of the first function parameter is determined depending on the dynamic constraint rule, which greatly improves the accuracy of the value range of the first function parameter. Here, the value range of a function parameter refers to the range of values that the function parameter may be selected from. For example, the value range of the parameter col_index_num in the VLOOKUP function is the range of the list of options for the function parameter.

At S204, the first function parameter is presented for prompt based on the value range.

Specifically, the value range is displayed in the form of, such as a drop-down list, a horizontal drop-down list or a prompting bubble, etc., at a position corresponding to the function parameter to provide a function parameter prompt for the user. The prompt for the first function parameter is thus achieved.

That is, after the value range of the first function parameter is obtained, the value range may be displayed in a certain form and at a position with respect to the first function parameter, for example, the value range is displayed in a drop-down list, a horizontal drop-down list or a prompting bubble, etc., to provide prompt of the function parameter to the user. The prompt of the first function parameter is thus achieved. The value range of the first function parameter may be displayed on top, bottom, left or right of the first function parameter, or displayed at a preset position in the spreadsheet.

In addition, with the display of the value range of the first function parameter, the user may directly select a value for the first function parameter from the displayed value range, or may input a value in the displayed value range in an input box. With the help of the prompt of the function parameter avoids an inappropriate input for the function parameter from the user.

In the method for providing a prompt of a function parameter in a spreadsheet provided by the embodiment of the present application, a first function parameter of a function in the spreadsheet is obtained. A determination is then made as to whether the first function parameter is associated with a dynamic constraint rule, which indicates that there is a dynamic constraint between the first function parameter and another function parameter of the function. If a dynamic constraint rule is associated with the first function parameter, a value range of the first function parameter is calculated based on the dynamic constraint rules. A prompt for the first function parameter is presented based on the value range. It can be seen that the value range of the function parameter associated with a dynamic constraint rule is determined based on the dynamic constraint rule, and a prompt for the function parameter is presented based on the value range, which facilitates a user to input a correct value for the function parameter quickly and accurately and thus an inappropriate input value for the function parameter is avoided.

In an embodiment of the present application, the determination as to whether a dynamic constraint rule is associated with the first function parameter includes:

retrieving a dynamic constraint parameter list for the spreadsheet, wherein the dynamic constraint parameter list contains all function parameters associated with respective dynamic constraints and the dynamic constraints; and determining whether the first function parameter is associated with the dynamic constraint rule from the dynamic constraint parameter list. The dynamic constraint parameter list is a set of elements, each of which includes a function parameter, another function parameter associated with the function parameter through a dynamic constraint, and the dynamic constraint.

Specifically, when the first function parameter is obtained, the dynamic constraint parameter list for the spreadsheet may be retrieved firstly. The dynamic constraint parameter list may be preset, which includes function parameters, other function parameters associated with the function parameters through dynamic constraints, and the dynamic constraints.

For example, the VLOOKUP function includes four function parameters, which are lookup value, data range containing the lookup value, the column number in the range containing the return value, and matching condition. The value range of the third function parameter, i.e., the column number, is based on the value range of the second function parameter, i.e., the data ranging. That is, there is a dynamic constraint between the second function parameter and the third function parameter. Thus, the preset dynamic constraint parameter list may contain an element that includes the column number, the data ranging, and the relationship between the values of the column number and the values of the data ranging, i.e., the dynamic constraint between both function parameters.

In an embodiment, the dynamic constraint parameter list may be preset and stored, for example, the table shown below.

| Function parameter 1 | Function parameter 2 | Dynamic constraint |
|---|---|---|
| Function parameter a1 | Function parameter b1 | Dynamic constraint 1 |
| Function parameter a2 | Function parameter b2, b3 | Dynamic constraint 2 |
| Function parameter a3 | Function parameter b4 | Dynamic constraint 3 |
| ... | ... | ... |
| Function parameter an | Function parameter bn | Dynamic constraint n |

The function parameter a1—the function parameter an are function parameters having a dynamic constraints in the spreadsheet, such as the above-described function parameter, column number. The function parameter b1—the function parameter bn are function parameters associated with the function parameter a1—the function parameter an through the dynamic constraints in the spreadsheet. In the dynamic constraint parameter list, there is a dynamic constraint between the function constraint 1 and the function parameter 2 in the same row. For example, if the function parameter a1 is the column number, the function parameter b1 is the data ranging. The dynamic constraint in the first row of the table is the dynamic constraint between the function parameter 1 and the function parameter 2.

The dynamic constraint parameter list may be used to determine whether the first function parameter is associated with the dynamic constraint rule. The dynamic constraint parameter list may be searched for the first function parameter. The presence of the first function parameter exists in the dynamic constraint parameter list means that the first function parameter is associated with a dynamic constraint rule.

Taking the above table as an example again, if the first function parameter is one of the function parameter a1—the function parameter an, there is a dynamic constraint rule associated with the first function parameter. If the first function parameter is not in the function parameter a1—the function parameter an, no dynamic constraint rule is associated with the first function parameter.

In an embodiment of the present application, the calculation of the value range of the first function parameter based on the dynamic constraint rule includes:

obtaining the first function parameter and a second function parameter associated with the first function parameter through a dynamic constraint in the same function, to obtain the value range of the first function parameter.

That is, the value range of the second function parameter associated with the first function parameter through the dynamic constraint is obtained; and the value range of the first function parameter is calculated based on the dynamic constraint and the value range of the second function parameter.

Specifically, for the first function parameter associated with the dynamic constraint rule, the second function parameter associated with the first function parameter through the dynamic constraint may be queried from the dynamic constraint parameter list. The second function parameter is a function parameter associated with the first function parameter through the dynamic constraint in the function to which the first function parameter belongs. The second function parameter may include all function parameters associated with the first function parameter through dynamic constraints. For example, the second function parameter and the third function parameter in the VLOOKUP function, i.e., the data ranging and the column number, are associated with each other through a dynamic constraint, and if the column number is taken as the first function parameter, the data ranging will be taken as the corresponding second function parameter.

Specifically, the value range of the first function parameter is based on the value range of the second function parameter associated with the first function parameter through the dynamic constraint. Thus, the value range of the second function parameter is firstly calculated based on the dynamic constraint rule, and the value range of the first function parameter is then determined based on the value range of the second function parameter.

That is, the value range of the first function parameter is determined based on the value range of the second function parameter associated with the first function parameter through the dynamic constraint. That is, the value range of the first function parameter depends on the value range of the second function parameter associated with the first function parameter through the dynamic constraint. Therefore, after determining the second function parameter associated with the first function parameter from the dynamic constraint parameter list, the value range of the second function parameter may be obtained firstly. The value range of the first function parameter may be determined based on the value range of the second function parameter and the dynamic constraint between the first function parameter and the second function parameter.

It can be appreciated that, when obtaining the first function parameter, a value for the second function parameter associated with the first function parameter through the dynamic constraint generally has been input into the spreadsheet. That is, the value of the second function parameter has been determined. Therefore, the determined value range of the second function parameter in the spreadsheet may be obtained. For example, if the value of the second function parameter that has been input into the spreadsheet is A1:D3, which represents all cells in the rectangular area from the first column and the first row to the fourth column and the third row, the value range of the second function parameter may be obtained as A1:D3.

In this way, after the value range of the second function parameter is obtained, the value range of the first function parameter can be calculated based on the dynamic constraint and the value range of the second function parameter. Since the dynamic constraint indicates the relationship between the value range of the first function parameter and the value range of the second function parameter, the value range of the first function parameter can be calculated from the dynamic constraint and the value range of the second function parameter.

It can be seen that the value range of the first function parameter is determined based on the value range of the second function parameter associated with the first function parameter through the dynamic constraint, instead of any possible range of cells in the spreadsheet. This greatly improves the accuracy of the value range of the function parameter.

In an embodiment of the present application, presenting the prompt of the first function parameter based on the value range includes:

displaying the value range of the first function parameter in a drop-down list or in a prompting bubble to obtain the display result; that is, prompting the first function parameter based on the display result. The value range of the first function parameter is displayed in the drop-down list or prompting bubble.

Specifically, after the value range of the first function parameter is obtained, the value range can be displayed at a position corresponding to the first function parameter, so that when a user is about to input the first function parameter, a prompt of the function parameter is provided to the user. Here, the value range of the first function parameter may be displayed in a drop-down list. The user may select a desired value for the function parameter from the drop-down list as an input, or may enter a value for the first function parameter based on the value range shown in the drop-down list. This facilitates a quick and accurate input of a value for the function parameter from the user, avoiding inputting an inappropriate value and avoiding the erroneous calculation of the function or formula.

Figures 3, 4:
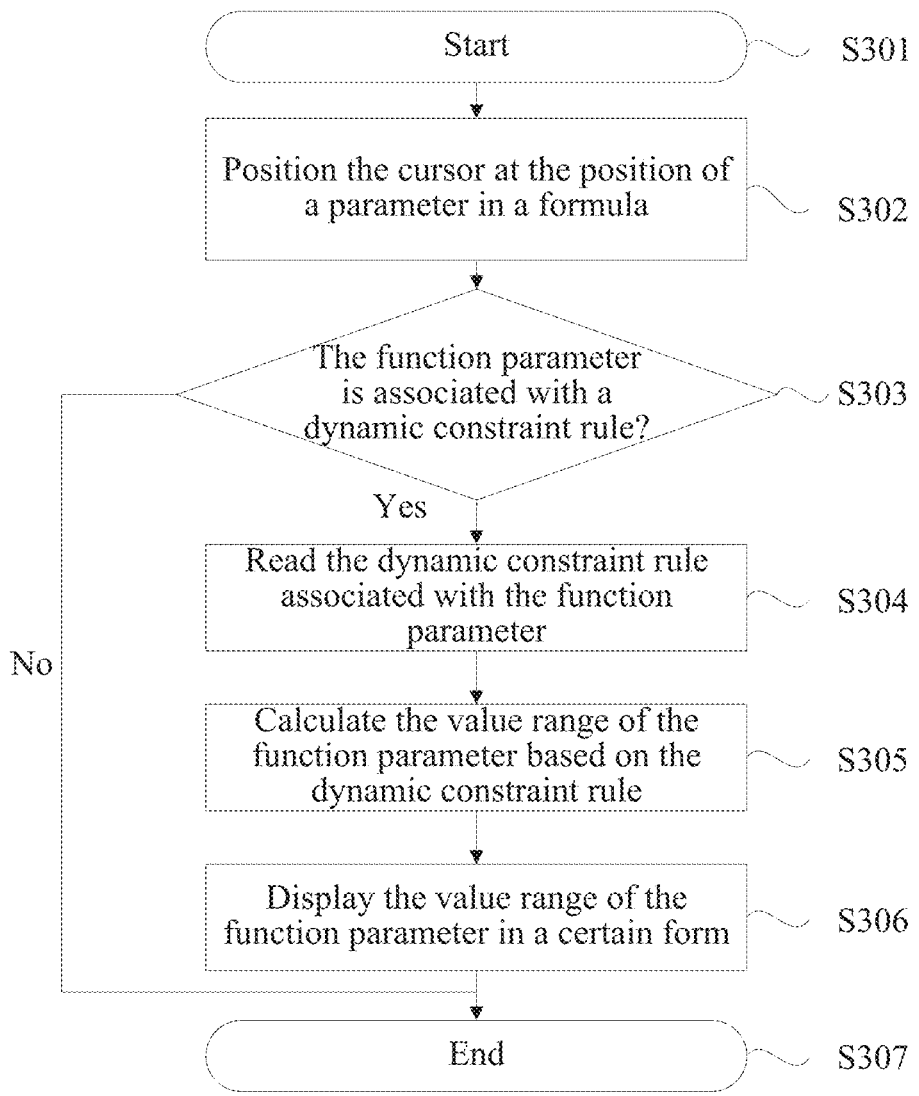
FIG. 3 is another schematic flowchart of a method for providing a prompt of a function parameter in a spreadsheet provided by an embodiment of the present application.
FIG. 4 is a schematic diagram using a method for providing a prompt of a function parameter in a spreadsheet provided by an embodiment of the present application.

Referring to FIG. 3, FIG. 3 shows another schematic flowchart of the method for providing a prompt of a function parameter in a spreadsheet provided by an embodiment of the present application, including the following steps.

The method starts at S301.

At S302, the cursor is positioned at the position of a parameter in a formula. That is, the cursor is positioned at the position of the function parameter in the function.

Here, when positioning the cursor at the position of the parameter in the formula, namely, inputting the function parameter, the system will detect that the function parameter is being input in the spreadsheet. That is to say, when the user positions the cursor at the position of a certain function parameter in the function, the user is about to input a value for this function parameter. At this point, the function parameter in the spreadsheet may be obtained.

At S303, it is determined whether a dynamic constraint rule is associated with the function parameter.

In this implementation, a determination is made as to whether the function parameter is associated with a dynamic constraint rule. If there is a dynamic constraint rule associated with the function parameter, the method proceeds to S304. Otherwise, the method proceeds to S307, at which the method ends. That is, a function parameter that is not associated with a dynamic constraint rule will not undergo step S304, but is processed in the same manner as in the prior art. The embodiment makes such determination with respect to the function parameter. This is totally different from the method for providing a prompt of a function parameter in the prior art, in which no determination is made as to whether there is a dynamic constraint rule associated with the function parameter and all function parameters are processed in a same way. By determining whether a dynamic constraint rule is associated with the function parameter and processing the function parameter accordingly, different value ranges for the function parameter are displayed for prompt, so that a more accurate value can be entered for the function parameter.

At S304, the dynamic constraint rule associated with the function parameter is read.

Here, for the function parameter associated with a dynamic constraint rule, the dynamic constraint rule is read. A dynamic constraint rule indicates that there is a dynamic constraint(s) between a function parameter in a function and another function parameter or parameters in this function. Thus, the other function parameter or parameters in the function, which are associated with the function parameter through a dynamic constraint(s), are obtained. In other words, a dynamic constraint rule associated with the function parameter is read. The dynamic constraint rule indicates that there is a dynamic constraint(s) between the function parameter and another function parameter or parameters in the function to which the function parameter belongs. The other function parameter or parameters associated with the function parameter through the dynamic constraint(s) can thus be obtained.

Here, reading the dynamic constraint rule associated with the function parameter may be understood as: determining another function parameter, wherein there is a dynamic constraint between this function parameter and the obtained function parameter; and determining the dynamic constraint between these function parameters. For example, a function parameter associated with the obtained function parameter through the dynamic constraint may be queried from the above-described dynamic constraint parameter list, and the dynamic constraint between the obtained function parameter and the queried function parameter may be determined.

At S305, a value range of the function parameter is calculated based on the dynamic constraint rule.

Here, since there is a dynamic constraint between the function parameter and another function parameter, the value range of the function parameter may be calculated from the value range of the other function parameter, which greatly improves the accuracy of the value range of the function parameter.

At S306, the value range of the function parameter is displayed in a certain form.

After the value range of the function parameter is obtained, the value range may be displayed at a position corresponding to the function parameter, so that when the user inputs a value for the function parameter, a prompt of the value range of the function parameter can be provided to the user. Here, the value range of the function parameter may be displayed in a drop-down list or a prompting bubble. The user may select a desired value for the function parameter from the drop-down list or from the prompting bubble as an input, or may input a value for the function parameter based on the value range displayed in the drop-down list or in the prompting bubble.

The method ends at S307.

It can be seen that in the method for providing a prompt of a function parameter in a spreadsheet provided by the embodiment of the present application, the value range of the function parameter associated with a dynamic constraint rule is determined based on the dynamic constraint rule, and a prompt for the function parameter is presented based on the value range, which facilitates a user to input a correct value for the function parameter quickly and accurately and thus an inappropriate input value for the function parameter is avoided.

FIG. 4 shows a specific application of the embodiment provided in the present application. FIG. 4 is a schematic diagram of application of the method for providing a prompt of a function parameter in a spreadsheet provided by the embodiment of the present application. FIG. 4 shows function parameters of the VLOOKUP function, which are lookup_value, table_array, col_index_num, [match_condition]. The value range of the third function parameter, col_index_num, depends on the value range of the second function parameter, table_array. In other words, there is a dynamic constraint between the second function parameter and the third function parameter. The lookup object containing the lookup value indicated by the second function parameter in the spreadsheet is obtained. As shown in FIG. 4 at the symbol a, the lookup object including the first column for Employee ID, the second column for Name, the third column for Position, and the fourth column for Level, which is the value of the second function parameter. Therefore, the range of the list of values for the third function parameter col_index_num is within the first column, the second column, the third column and the fourth column, which correspond to Employee ID, Name, Position and Level respectively. That is, the value range of the third function parameter col_index_num is (Employee ID, Name, Position, Level). The value range (Employee ID, Name, Position, Level) for col_index_num is displayed in a drop-down list at the position corresponding to the function parameter col_index_num. As shown in FIG. 4 at the symbol b, a user may select a desired value for the function parameter from the drop-down list as an input, or may enter a value for the function parameter by reference to the value range in the displayed drop-down list. Here, the third function parameter in the figure corresponds to the first function parameter in the method for providing a prompt of a function parameter in a spreadsheet provided by the embodiment of the present application, and the second function parameter in the figure corresponds to the second function parameter in the method for providing a prompt of a function parameter in a spreadsheet provided by the embodiment of the present application.

Figure 5:
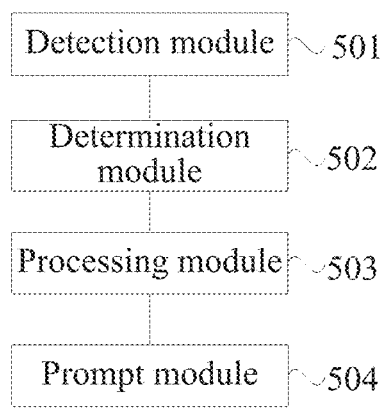
FIG. 5 is a schematic structural diagram of an apparatus for providing a prompt of a function parameter in a spreadsheet provided by an embodiment of the present application.

Referring to FIG. 5, FIG. 5 shows a schematic structural diagram of an apparatus for providing a prompt of a function parameter in a spreadsheet provided by an embodiment of the present application. The apparatus includes the following modules:

a detection module 501, configured for obtaining a first function parameter of a function in the spreadsheet:

a determination module 502, configured for determining whether the first function parameter is associated with a dynamic constraint rule, wherein the dynamic constraint rule indicates that there is a dynamic constraint between the first function parameter and another function parameter in the function:

a processing module 503, configured for, if the first function parameter is associated with a dynamic constraint rule, calculating a value range of the first function parameter based on the dynamic constraint rule; and a prompt module 504, configured for presenting a prompt for the first function parameter based on the value range.

Further, the determination module 502 includes:

a retrieving sub-module, configured for retrieving a dynamic constraint parameter list for the spreadsheet, wherein the dynamic constraint parameter list is a set of elements comprising a function parameter, another function parameter associated with the function parameter through a dynamic constraint, and the dynamic constraint; and a determination sub-module, configured for determining whether the first function parameter is associated with the dynamic constraint rule from the dynamic constraint parameter list.

Further, the processing module 503 includes:

a value obtaining sub-module, configured for obtaining a value range of a second function parameter in the function, which is associated with the first function parameter through a dynamic constraint; and a calculation sub-module, configured for calculating the value range of the first function parameter based on the dynamic constraint and the value range of the second function parameter.

Further, the prompt module 504 includes:

a display sub-module, configured for displaying the value range of the first function parameter in a drop-down list or in a prompting bubble.

Further, the detection module 501 includes:

a detection sub-module, configured detecting input for the first function parameter in the spreadsheet.

As can be seen, the apparatus for providing a prompt of a function parameter in a spreadsheet provided by the embodiment of the present application first obtains, by means of the detection module, a first function parameter of a function in the spreadsheet. The apparatus then determines, by means of the determination module, whether the first function parameter is associated with a dynamic constraint rule which indicates that there is a dynamic constraint between the first function parameter and another function parameter in the function. The apparatus calculates, by means of the processing module, a value range of the first function parameter based on the dynamic constraint rule if the first function parameter is associated with a dynamic constraint rule. The apparatus presents, by means of the displaying module, a prompt for the first function parameter based on the value range. It can be seen that the value range of the function parameter associated with a dynamic constraint rule is determined based on the dynamic constraint rule, and a prompt for the function parameter is presented based on the value range, which facilitates a user to input a correct value for the function parameter quickly and accurately, and thus an inappropriate input value for the function parameter is avoided and then an erroneous calculation of the formula is avoided.

Figure 6:
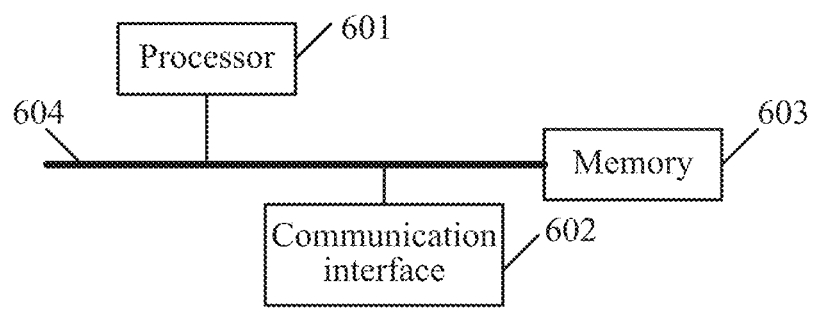
FIG. 6 is a schematic structural diagram of an electronic device provided by an embodiment of the present application.

An embodiment of the present application provides an electronic device. As shown in FIG. 6, the electronic device includes a processor 601, a communication interface 602, a memory 603 and a communication bus 604. The processor 601, the communication interface 602 and the memory 603 communicate with each other via the communication bus 604.

The memory 603 is configured for storing a computer program.

The processor 601 is configured for executing the program stored on the memory 603 to carry out steps including:

obtaining a first function parameter of a function in the spreadsheet;

determining whether the first function parameter is associated with a dynamic constraint rule, wherein the dynamic constraint rule indicates that there is a dynamic constraint between the first function parameter and another function parameter in the function;

if the first function parameter is associated with a dynamic constraint rule, calculating a value range of the first function parameter based on the dynamic constraint rule; and presenting a prompt for the first function parameter based on the value range.

As can be seen, in the solution provided by the embodiment of the present application, the electronic device first obtains a first function parameter of a function in the spreadsheet. The electronic device then determines whether the first function parameter is associated with a dynamic constraint rule, which indicates that there is a dynamic constraint between the first function parameter and another function parameter in the same function. If there is a dynamic constraint rule associated with the first function parameter, the electronic device calculates a value range of the first function parameter based on the dynamic constraint rule; and presents a prompt for the first function parameter based on the value range. It can be seen that the value range of the function parameter associated with a dynamic constraint rule is determined based on the dynamic constraint rule, and a prompt for the function parameter is presented based on the value range, which facilitates a user to input a correct value for the function parameter quickly and accurately and thus an inappropriate input value for the function parameter is avoided.

The communication bus in the electronic device may be a peripheral component interconnect (PCI) bus, an extended industry standard architecture (EISA) bus, or the like. The communication bus may include an address bus, a data bus, a control bus, or the like. For ease of representation, only one thick line is shown in the figure, which does not mean there is only one communication bus or one type of communication bus.

The communication interface is configured for facilitating communication between the electronic device and other devices.

The determination as to whether the first function parameter is associated with a dynamic constraint rule includes:

retrieving a dynamic constraint parameter list for the spreadsheet, wherein the dynamic constraint parameter list is a set of elements comprising a function parameter, another function parameter associated with the function parameter through a dynamic constraint, and the dynamic constraint; and determining whether the first function parameter is associated with the dynamic constraint rule from the dynamic constraint parameter list.

The calculation of the value range of the first function parameter based on the dynamic constraint rule includes:

obtaining a value range of a second function parameter in the function, which is associated with the first function parameter through a dynamic constraint; and calculating the value range of the first function parameter based on the dynamic constraint and the value range of the second function parameter.

The presentation of the prompt for the first function parameter based on the value range includes:

displaying the value range of the first function parameter in a drop-down list or in a prompting bubble.

The obtainment of the first function parameter of the function in the spreadsheet includes:

detecting input for the first function parameter in the spreadsheet.

An embodiment of the present application further provides a computer readable storage medium having stored thereon a computer program which, when executed by a processor, causes the processor to carry out steps including:

obtaining a first function parameter of a function in the spreadsheet;

determining whether the first function parameter is associated with a dynamic constraint rule, wherein the dynamic constraint rule indicates that there is a dynamic constraint between the first function parameter and another function parameter in the function;

if the first function parameter is associated with a dynamic constraint rule, calculating a value range of the first function parameter based on the dynamic constraint rule; and presenting a prompt for the first function parameter based on the value range.

It can be seen that, in the solution provided by the embodiment of the present application, the computer program, when executed by the processor, causes the processor to obtain a first function parameter of a function in the spreadsheet; and then determines whether the first function parameter is associated with a dynamic constraint rule, wherein the dynamic constraint rule indicates that there is a dynamic constraint between the first function parameter and another function parameters in the same function. If there is a dynamic constraint rule associated with the first function parameter, a value range of the first function parameter is calculated based on the dynamic constraint rule; and a prompt for the first function parameter is presented based on the value range. It can be seen that the value range of the function parameter associated with a dynamic constraint rule is determined based on the dynamic constraint rule, and a prompt for the function parameter is presented based on the value range, which facilitates a user to input a correct value for the function parameter quickly and accurately and thus an inappropriate input value for the function parameter is avoided.

The memory may include a random access memory (RAM), or may include a non-volatile memory (NVM), for example at least one disk memory. Optionally, the memory may also be at least one storage located away from the above-described processor.

The processor may be a general-purpose processor, such as a central processing unit (CPU), a network processor (NP), or the like. The processor may also be a digital signal processor (DSP), an application specific integrated circuit (ASIC), a field-programmable gate array (FPGA) or other programmable logic devices, a discrete gate or a transistor logic device, a discrete hardware component.

The determination as to whether the first function parameter is associated with a dynamic constraint rule includes:

retrieving a dynamic constraint parameter list for the spreadsheet, wherein the dynamic constraint parameter list is a set of elements comprising a function parameter, another function parameter associated with the function parameter through a dynamic constraint, and the dynamic constraint; and determining whether the first function parameter is associated with the dynamic constraint rule from the dynamic constraint parameter list.

The calculation of the value range of the first function parameter based on the dynamic constraint rule includes:

obtaining a value range of a second function parameter in the function, which is associated with the first function parameter through a dynamic constraint; and calculating the value range of the first function parameter based on the dynamic constraint and the value range of the second function parameter.

The presentation of the prompt for the first function parameter based on the value range includes:

displaying the value range of the first function parameter in a drop-down list or in a prompting bubble.

The obtaining of the first function parameter of the function in the spreadsheet includes:

detecting input for the first function parameter in the spreadsheet.

An embodiment of the present invention further provides an application program which, when executed by a processor, causes the processor to carry out steps including:

obtaining a first function parameter of a function in the spreadsheet;

determining whether the first function parameter is associated with a dynamic constraint rule, wherein the dynamic constraint rule indicates that there is a dynamic constraint between the first function parameter and another function parameter in the function;

if the first function parameter is associated with a dynamic constraint rule, calculating a value range of the first function parameter based on the dynamic constraint rule; and presenting a prompt for the first function parameter based on the value range.

It can be seen that, in the solution provided by the embodiment of the present application, the application program, when executed by the processor, causes the processor to obtain a first function parameter of a function in the spreadsheet; and then determines whether the first function parameter is associated with a dynamic constraint rule, wherein the dynamic constraint rule is that there is a dynamic constraint between the first function parameter and another function parameter in the same function to which the first function parameter belongs. If there is a dynamic constraint rule associated with the first function parameter, the processor is caused to calculate a value range of the first function parameter based on the dynamic constraint rule; and present a prompt for the first function parameter based on the value range. It can be seen that the value range of the function parameter associated with a dynamic constraint rule is determined based on the dynamic constraint rule, and a prompt for the function parameter is presented based on the value range, which facilitates a user to input a correct value for the function parameter quickly and accurately and thus an inappropriate input value for the function parameter is avoided.

The determination as to whether the first function parameter is associated with a dynamic constraint rule includes:

retrieving a dynamic constraint parameter list for the spreadsheet, wherein the dynamic constraint parameter list is a set of elements comprising a function parameter, another function parameter associated with the function parameter through a dynamic constraint, and the dynamic constraint; and determining whether the first function parameter is associated with the dynamic constraint rule from the dynamic constraint parameter list.

The calculation of the value range of the first function parameter based on the dynamic constraint rule includes:

obtaining a value range of a second function parameter in the function, which is associated with the first function parameter through a dynamic constraint; and calculating the value range of the first function parameter based on the dynamic constraint and the value range of the second function parameter.

The presentation of the prompt for the first function parameter based on the value range includes:

displaying the value range of the first function parameter in a drop-down list or in a prompting bubble.

The obtaining of the first function parameter of a function in the spreadsheet includes:

detecting input for the first function parameter in the spreadsheet.

It should be noted that, a brief description is provided for embodiments of the apparatus, electronic device, application program and computer readable storage medium in view of their resemblance with the embodiments of the method. Relevant details can be known with reference to the description of the method embodiments.

It should further be noted that the relationship terms herein such as "first", "second" and the like, if any, are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices including a series of elements include not only those elements listed but also those not specifically listed or the elements intrinsic to these processes, methods, articles, or devices. Without further limitations, elements defined by the wording "comprise(s) a . . . " or "include(s) a . . . " do not exclude additional identical elements in the processes, methods, articles or devices, including the listed elements.

All the embodiments in the description are described in correlated manner, same or similar parts in each of the embodiments can be referred to one another. In addition, the description for each embodiment focuses on the differences from other embodiments. In particular, the embodiments of the apparatus, electronic device and computer readable storage medium are described briefly, since they are substantially similar to the embodiment of the method, and the related contents can refer to the description of the embodiment of the method.

The embodiments described above are simply preferred embodiments of the present application, and are not intended to limit the protection scope of the present application. Any modifications, alternatives, improvements, or the like within the spirit and principle of the present application shall be included within the protection scope of the present application.

The invention claimed is:

1. A method for providing a prompt of a function parameter in a spreadsheet to a user, which is applied to an electronic device, comprising:

obtaining a first function parameter of a function in the spreadsheet by detecting an operation of the first function parameter of the function inputted by a user accessing the spreadsheet;

determining whether the first function parameter is associated with a dynamic constraint rule, wherein the dynamic constraint rule indicates a dynamic constraint between the first function parameter and a second function parameter of the function, wherein the first function parameter is associated with a first list of values in the spreadsheet and the second function parameter is associated with a second list of values in the spreadsheet;

in response to determining that the first function parameter is associated with the dynamic constraint rule, calculating a value range of the first function parameter based on the dynamic constraint rule, wherein calculating the value range of the first function parameter comprises:

obtaining a value range of the second function parameter of the function based on the second list of values, wherein the value range of the second function parameter is associated with the first function parameter through the dynamic constraint; and calculating the value range of the first function parameter based on the dynamic constraint, the value range of the second function parameter, and the first list of values, wherein the dynamic constraint is a relationship between the value ranges of the first and second function parameters such that the value ranges of the first function parameter changes based on the value ranges of the second function parameter, and the dynamic constraint is determined by retrieving a dynamic constraint parameter list for the spreadsheet;

presenting a prompt for the user, wherein the prompt displays the value range of the first function parameter for selection by the user.

2. The method of claim 1, wherein determining whether the first function parameter is associated with the dynamic constraint rule comprises:

retrieving a dynamic constraint parameter list for the spreadsheet, wherein the dynamic constraint parameter list is a set of elements comprising a function parameter, another function parameter associated with the function parameter through a dynamic constraint, and the dynamic constraint; and determining whether the first function parameter is associated with the dynamic constraint rule from the dynamic constraint parameter list.

3. The method of claim 1, wherein presenting the prompt of the first function parameter based on the value range comprises:

displaying the value range of the first function parameter in a drop-down list or in a prompting bubble.

4. The method of claim 1, wherein obtaining the first function parameter of the function in the spreadsheet comprises:

detecting an input for the first function parameter in the spreadsheet.

5. An apparatus for providing a prompt of a function parameter in a spreadsheet to a user, comprising:

a detection module, configured for obtaining a first function parameter of a function in the spreadsheet by detecting an operation of the first function parameter of the function inputting by a user accessing the spreadsheet;

a determination module, configured for determining whether the first function parameter is associated with a dynamic constraint rule, wherein the dynamic constraint rule indicates a dynamic constraint between the first function parameter and a second function parameter of the function, wherein the first function parameter is associated with a first list of values in the spreadsheet and the second function parameter is associated with a second list of values in the spreadsheet;

a processing module, configured for, in response to determining that the first function parameter is associated with the dynamic constraint rule, calculating a value range of the first function parameter based on the dynamic constraint rule;

wherein the processing module comprises:

a value obtaining sub-module, configured for obtaining a value range of the second function parameter of the function based on the second list of values, wherein the value range of the second function parameter is associated with the first function parameter through the dynamic constraint; and a calculation sub-module, configured for calculating the value range of the first function parameter based on the dynamic constraint, the value range of the second function parameter, and the first list of values, wherein the dynamic constraint is a relationship between the value ranges of the first and second function parameters such that the value ranges of the first function parameter changes based on the value ranges of the second function parameter, and the dynamic constraint is determined by retrieving a dynamic constraint parameter list for the spreadsheet;

a prompt module, configured for presenting a prompt for the user, wherein the prompt displays the value range of the first function parameter for selection by the user.

6. The device of claim 5, wherein the determination module comprises:

a retrieving sub-module, configured for retrieving a dynamic constraint parameter list for the spreadsheet, wherein the dynamic constraint parameter list is a set of elements comprising a function parameter, another function parameter associated with the function parameter through a dynamic constraint, and the dynamic constraint; and a determination sub-module, configured for determining whether the first function parameter is associated with the dynamic constraint rule from the dynamic constraint parameter list.

7. The apparatus of claim 5, wherein the prompt module comprises:

a display sub-module, configured for displaying the value range of the first function parameter in a drop-down list or in a prompting bubble.

8. The apparatus of claim 5, wherein the detection module comprises:

a detection sub-module, configured for detecting an input for the first function parameter in the spreadsheet.

9. An electronic device, comprising a processor, a communication interface, a memory and a communication bus, wherein the processor, the communication interface and the memory communicate with each other via the communication bus;

the memory is configured for storing a computer program; and the processor is configured for carrying out steps of the method of claim 1 by executing the computer program stored on the memory.

10. A non-transitory computer readable storage medium having stored thereon a computer program which, when executed by a processor, causes the processor to carry out steps of the method of claim 1.

* * * * *